United States Patent
Batrouni et al.

(10) Patent No.: US 9,781,205 B2
(45) Date of Patent: Oct. 3, 2017

(54) COORDINATION ENGINE FOR CLOUD SELECTION

(75) Inventors: Marwan Batrouni, Bellevue, WA (US); Shady N. Ashkar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 13/230,487

(22) Filed: Sep. 12, 2011

(65) Prior Publication Data

US 2013/0067090 A1    Mar. 14, 2013

(51) Int. Cl.
*G06F 15/173*    (2006.01)
*H04L 29/08*    (2006.01)
*H04L 12/24*    (2006.01)

(52) U.S. Cl.
CPC .......... *H04L 67/1097* (2013.01); *H04L 67/10* (2013.01); *H04L 41/022* (2013.01);
(Continued)

(58) Field of Classification Search
CPC .... G06F 9/5055; G06F 9/5072; G06F 9/5077; G06F 3/067; H04L 41/12; H04L 67/10; H04L 67/1097; H04L 67/16
(Continued)

(56) References Cited

U.S. PATENT DOCUMENTS 7,533,184 B2    5/2009    Miller et al.
8,234,377 B2 *   7/2012    Cohn .................. G06F 9/5061
                                                     709/223
(Continued)

FOREIGN PATENT DOCUMENTS

CA    2709497 A1    1/2011
CN    102118430 A    7/2011
(Continued)

OTHER PUBLICATIONS

Ang Li et al., "CloudCmp: Comparing Public Cloud Providers" In the International Conference, IMC '10, Melbourne, Australia, Nov. 1-3, 2010. See Section 3.3 and Chapter 4.6. 12 pages.
(Continued)

*Primary Examiner* — Blake Rubin
(74) *Attorney, Agent, or Firm* — Shook, Hardy & Bacon L.L.P.

(57) ABSTRACT

Methods, systems, and computer-readable media for selecting and managing a public cloud-computing network to host a client's account information are provided. Initially, the client issues a request to a coordination engine, which understands rules language of various public clouds, to update the account information residing on a target cloud. The target cloud was previously selected from the various public clouds as a function of desirable criteria specified by the client in light of properties (e.g., pricing, security, and reliability) dynamically abstracted from the public clouds. When addressing the request, the coordination engine extracts command(s) from the request and automatically translates the command(s) consistent with the rules language of the target cloud. Upon delivery to the target cloud, the translated command(s) affect reading of or writing to the account information. Accordingly, the client is absolved from converting instructions into a format that is expected by the target cloud.

20 Claims, 7 Drawing Sheets

(52) U.S. Cl.
CPC ...... *H04L 41/0226* (2013.01); *H04L 67/1012* (2013.01); *H04L 67/1014* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 8,261,295 | B1* | 9/2012 | Risbood | G06F 8/61 717/177 |
| 8,458,780 | B1* | 6/2013 | Takkallapally et al. | 726/7 |
| 8,924,569 | B2 | 12/2014 | Li | |
| 2003/0177176 | A1* | 9/2003 | Hirschfeld et al. | 709/203 |
| 2006/0059253 | A1* | 3/2006 | Goodman et al. | 709/223 |
| 2008/0256095 | A1 | 10/2008 | Wakefield | |
| 2009/0199175 | A1 | 8/2009 | Keller et al. | |
| 2009/0276771 | A1* | 11/2009 | Nickolov | G06F 9/4856 717/177 |
| 2010/0131624 | A1 | 5/2010 | Ferris | |
| 2010/0154045 | A1 | 6/2010 | Pairault et al. | |
| 2011/0010456 | A1 | 1/2011 | Saeki | |
| 2011/0026704 | A1 | 2/2011 | Connelly et al. | |
| 2011/0047253 | A1 | 2/2011 | Bhat | |
| 2011/0055385 | A1* | 3/2011 | Tung | G06F 9/5072 709/224 |
| 2011/0075667 | A1* | 3/2011 | Li et al. | 370/392 |
| 2011/0078303 | A1* | 3/2011 | Li | G06F 9/505 709/224 |
| 2011/0126197 | A1* | 5/2011 | Larsen et al. | 718/1 |
| 2011/0138034 | A1* | 6/2011 | Brookbanks et al. | 709/224 |
| 2011/0145393 | A1* | 6/2011 | Ben-Zvi | G06F 9/5011 709/224 |
| 2011/0145413 | A1* | 6/2011 | Dawson et al. | 709/226 |
| 2011/0153727 | A1* | 6/2011 | Li | 709/203 |
| 2011/0213875 | A1 | 9/2011 | Ferris et al. | |
| 2011/0213971 | A1* | 9/2011 | Gurel et al. | 713/165 |
| 2011/0225451 | A1* | 9/2011 | Leggette | G06F 12/1425 714/6.22 |
| 2011/0231899 | A1* | 9/2011 | Pulier et al. | 726/1 |
| 2011/0238458 | A1* | 9/2011 | Purcell | G06F 9/5072 705/7.27 |
| 2011/0251937 | A1* | 10/2011 | Falk et al. | 705/34 |
| 2011/0252071 | A1* | 10/2011 | Cidon | G06F 17/30174 707/802 |
| 2011/0276951 | A1* | 11/2011 | Jain | G06F 11/3006 717/140 |
| 2011/0296000 | A1* | 12/2011 | Ferris | G06Q 10/00 709/224 |
| 2011/0296311 | A1* | 12/2011 | Dias et al. | 715/736 |
| 2011/0302312 | A1* | 12/2011 | McCrory | G06F 9/541 709/226 |
| 2011/0320606 | A1* | 12/2011 | Madduri et al. | 709/226 |
| 2012/0054248 | A1* | 3/2012 | Mehrotra et al. | 707/803 |
| 2012/0066670 | A1* | 3/2012 | McCarthy | H04L 41/0806 717/169 |
| 2012/0072985 | A1* | 3/2012 | Davne et al. | 726/22 |
| 2012/0123898 | A1* | 5/2012 | Kirkeby et al. | 705/26.7 |
| 2012/0131594 | A1* | 5/2012 | Morgan | G06F 9/5072 718/105 |
| 2012/0144034 | A1* | 6/2012 | McCarty | 709/225 |
| 2012/0166646 | A1* | 6/2012 | Boldyrev | G06F 9/5088 709/226 |
| 2012/0173822 | A1* | 7/2012 | Testardi et al. | 711/135 |
| 2012/0179820 | A1* | 7/2012 | Ringdahl et al. | 709/225 |
| 2012/0185913 | A1* | 7/2012 | Martinez | G06F 9/455 726/1 |
| 2012/0192263 | A1* | 7/2012 | Lin | H04L 67/1097 726/12 |
| 2012/0203823 | A1* | 8/2012 | Manglik | G06F 9/5072 709/203 |
| 2012/0204187 | A1* | 8/2012 | Breiter et al. | 718/105 |
| 2012/0221696 | A1* | 8/2012 | Ferris | H04L 67/327 709/223 |
| 2012/0222084 | A1* | 8/2012 | Beaty et al. | 726/1 |
| 2012/0233668 | A1* | 9/2012 | Leafe | G06F 9/5022 726/4 |
| 2013/0124704 | A1* | 5/2013 | Bhogal | G06F 9/5072 709/223 |

FOREIGN PATENT DOCUMENTS

| | | |
|---|---|---|
| EP | 2336886 A2 | 6/2011 |
| RU | 2179738 C2 | 2/2002 |
| WO | 9957839 A2 | 11/1999 |

OTHER PUBLICATIONS

PCT International Search Report mailed Feb. 27, 2013 regarding International Appln. No. PCT/US2012/054344 12 pages.

Dooley, Brian J., "Architectural Requirements of the Hybrid Cloud", Retrieved on: May 3, 2011, 3 pages Available at: http://www.information-management.com/news/hybrid-cloud-architectural-requirements-10017152-1.html.

Heckel, Philipp C., "Hybrid Clouds: Comparing Cloud Toolkits", Published on: Apr. 2010, 30 pages Available at: http://www.philippheckel.com/files/hybrid-cloud-paper.pdf.

"Getting the most from a Hybrid Cloud", Retrieved on: May 3, 2011, 3 pages Available at: http://www.cloudcomputing365.net/news_full.php?id=17874&title=Getting-the-most-from-a-hybrid-cloud.

Vecchiola, et al., "Platform and Software as a Service (Paas/Iaas)", Retrieved on: May 3, 2011, 26 pages Available at: http://www.buyya.com/papers/Aneka-Cloud-Chapter2011.pdf.

Macvittie, Lori, "Public, Private and Enterprise Cloud: Economy of Scale Versus Efficiency of Scale", Retrieved on: May 3, 2011, 4 pages Available at: http://www.privatecloud.com/2011/04/11/public-private-and-enterprise-cloud-economy-of-scale-versus-efficiency-of-scale/?fbid=Qe5p6ory7iQ.

U.S. Appl. No. 12/907,996, "Communication and Coordination Between Web Services in a Cloud-based Computing Environment", filed Oct. 20, 2010, 21 pages and 5 Sheets of Drawings.

Craig, et al., "Cloud Computing in the Public Sector", Published on: Nov. 2009, 20 pages Available at: http://www.cititechsolutions.com/pdf/CloudComputing.pdf.

"First Office Action and Search Report Issued in Chinese Patent Application No. 201210335506.9", Mailed Date: Dec. 2, 2014, 15 Pages.

"Supplementary Search Report Issued in European Patent Application No. 12831620.5", Mailed Date: Aug. 24, 2015, 14 Pages.

"Second Office Action Issued in Chinese Patent Application No. 201210335506.9", Mailed Date: Aug. 3, 2015, 10 Pages.

Australian Office Action dated Sep. 13, 2016 for Australian Patent Application No. 2012308929, 5 Pages.

* cited by examiner

300 →

| ENTRY | CLOUD IDENTITY | RESOURCE | AVAILABILITY SCORE | PERFORMANCE SCORE | PRICING SCHEME |
|---|---|---|---|---|---|
| 1 | AMAZON® | STORAGE | 99.9% | 123.456 | $0.02 PER GB |
| 2 | WINDOWS AZURE® | VIRTUAL MACHINE | 99.999% | 654.321 | $0.15 PER HOUR |
| ... | | | | | |
| N | | | | | |

| RULE # | RESOURCE | TERMS |
|---|---|---|
| 1 | STORAGE | PRICE ≤ $0.10 PER GB |
| 2 | VIRTUAL MACHINE | AVAILABILITY > 99.99% |
| ... | | |
| N | | |

*FIG. 4.*

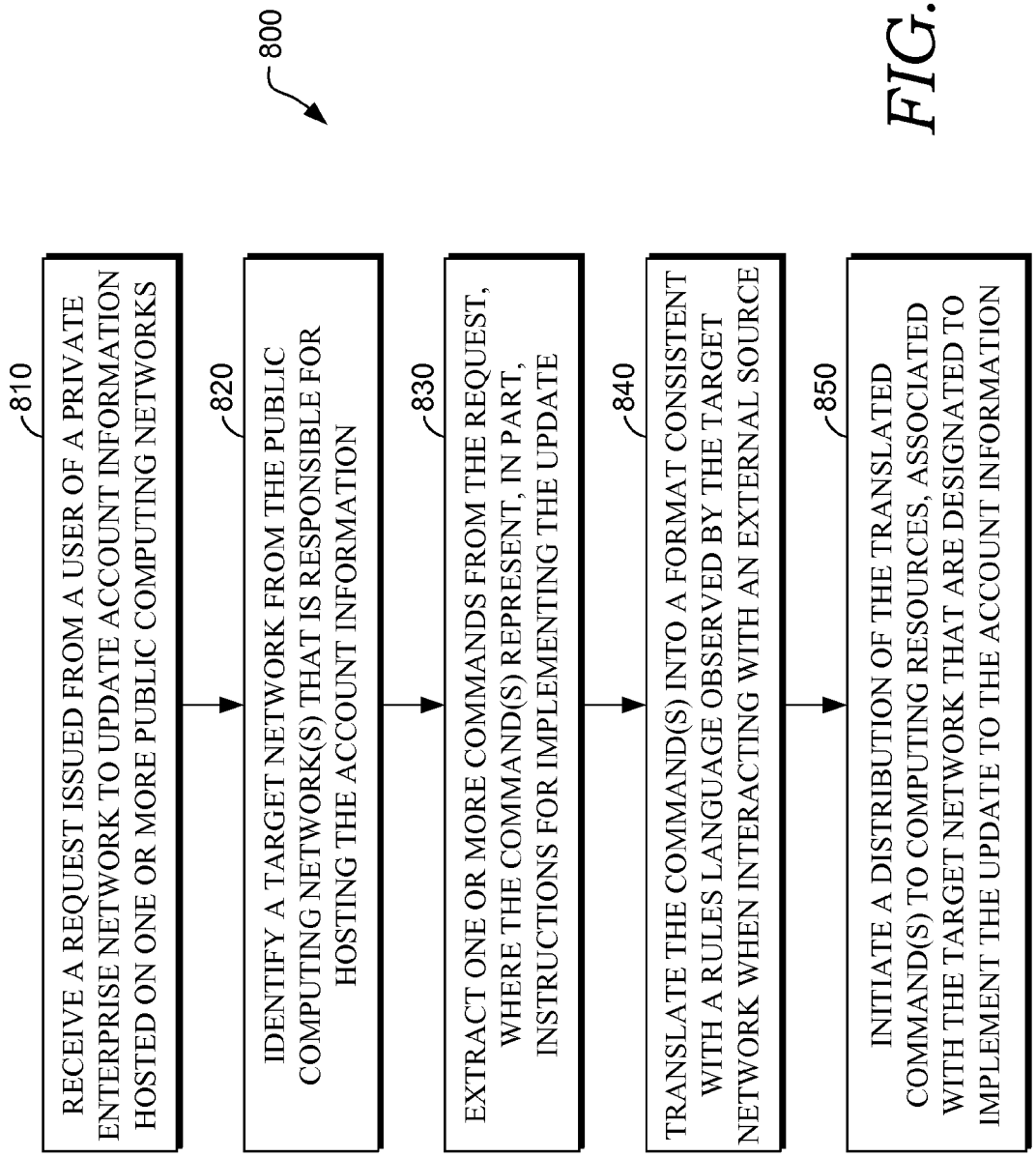

COORDINATION ENGINE FOR CLOUD SELECTION

BACKGROUND

Generally, providers of cloud services offer public cloud-computing network(s) to assist individuals or companies in managing account information, such as running applications and/or storing data. For instance, a public cloud-computing network ("public network") may be employed by administrators of a private enterprise network to host their account information, where the administrators are typically tasked with selecting the public network. Today, the administrators are forced to blindly select the public network to persist their account information, as properties of cloud services are not readily discoverable or are completely inaccessible. Accordingly, the administrators are generally unable to identify whether the selected public network offers cloud services that best align with their preferences.

Once the public network is selected, the administrators must establish a means of interacting with the selected public network. Often, establishing the means of interacting is a labor-intensive process where the administrators attempt to learn an interface language for the selected public network. Once established, the means of interacting is employed to manually convert communications to the selected public network into the interface language on an ad hoc basis. Thus, the administrators are incentivized to expand their private enterprise network in order to avoid the complications inherent with overflowing to a public network: this practice is inefficient and uneconomical to address a dynamically fluctuating need for computing resources.

As shall be discussed in detail herein, embodiments of the present invention introduce technology to automatically select public cloud(s) that meet a set of criteria specified by the administrators and to facilitate simplistic interaction with the selected public cloud(s).

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for abstracting information that generally describes the interaction between a private cloud-computing network ("private cloud") and at least one public cloud-computing network ("public cloud"). This "abstraction" generally represents a collection of mined data that is relied upon when making determinations affecting account information associated with the private cloud. Typically, a coordination engine is provided to perform the abstraction without requiring administrators of the private cloud to perform such duties as tracking or analyzing low-level details of the day-to-day operations of the public cloud. That is, the coordination engine serves to relieve the administrators from understanding properties of public clouds and intelligently selecting an optimum public cloud based on those properties.

In addition, the coordination engine is designed to automatically update the selected public cloud with another public cloud. In one instance, updating is invoked upon noticing changes within the abstractions, which reflect underlying changes to the properties of the private clouds. In another instance, updating is invoked upon the administrators submitting changes to criteria, which specify the cloud-service attributes that are preferable to the administrators. As such, the intelligent selections of the coordination engine may be based, in part, on the private-cloud properties, administer-generated criteria, or a combination thereof. This is in contrast to forcing the administrators individually and frequently to query the providers of public clouds, on an ad-hoc basis, in order to realize the properties exhibited by those private clouds and to manually act on changes to those properties.

Other embodiments of the present invention introduce an application programming interface (API), running in the background, that monitors and facilitates ongoing transactions between the private cloud and the selected public clouds. Typically, the API is capable of accessing a rules language (RL) that is imposed by the selected public clouds and applying the rules language when translating communications between clouds. Thus, the API makes the process of sending and converting commands to the account information on the selected public cloud transparent to the administrators.

By way of example, the administrators may be curators of a financial institution's banking information. In this case, the administrators may specify that the criteria of highest importance for selecting a private cloud is security. Upon submitting this criteria to the coordination engine, a public cloud that enforces a high level of protection against hacking may be selected for hosting the banking information. Typically, the coordination engine would review abstractions of a set of public clouds when making the selection in order to compare the properties of the respective public clouds against the submitted criteria.

In another example, the administrators may be curators of a online shopping forum's inventory information. In this case, the administrators may specify that the criteria of highest importance for selecting a private cloud is cost. Upon submitting this criteria to the coordination engine, a public cloud that expects a relatively minimal fee for usage may be selected for hosting the inventory information. Once the public cloud is selected, the coordination engine may trigger the API to automatically begin packaging commands from the online shopping forum into a format that corresponds with a rules language of the selected public cloud. Further, the coordination engine is configured to shift usage from the public cloud selected in this second example with the public cloud selected in the first example (immediately above) if the criteria submitted by the online shopping forum indicates that security is now paramount over cost.

Although two different types of criteria (cost and security) that may be specified by the administrators have been described, it should be understood and appreciated that other types of suitable criteria that operate to communicate the administrators' preferences and to aid in selecting public clouds may be used, and that embodiments of the present invention are not limited to those criteria described herein. For instance, one or more of the following criteria is completed as being used for guiding selection of a public cloud: availability of computing resources with reduced downtime; scalability (e.g., private clouds may not offer the same level of scalability as public clouds); geo-redundancy offering cloud services in physical proximity to those using the account information hosted thereon; and unique features available only in some public clouds.

BRIEF DESCRIPTION OF THE DRAWINGS

Embodiments of the present invention are described in detail below with reference to the attached drawing figures, wherein:

FIG. 3 is an exemplary schematic diagram of a manifest that lists properties abstracted from public and/or private clouds, in accordance with an embodiment of the present invention;

FIG. 4 is an exemplary schematic diagram of a manifest that lists terms submitted by an administrator for guiding selection of public and/or private cloud(s), in accordance with an embodiment of the present invention;

FIG. 8 is a flow diagram showing an overall method for distributing workload to one or more public computing networks external to a private enterprise network, in accordance with an embodiment of the present invention.

DETAILED DESCRIPTION

Figure 1:
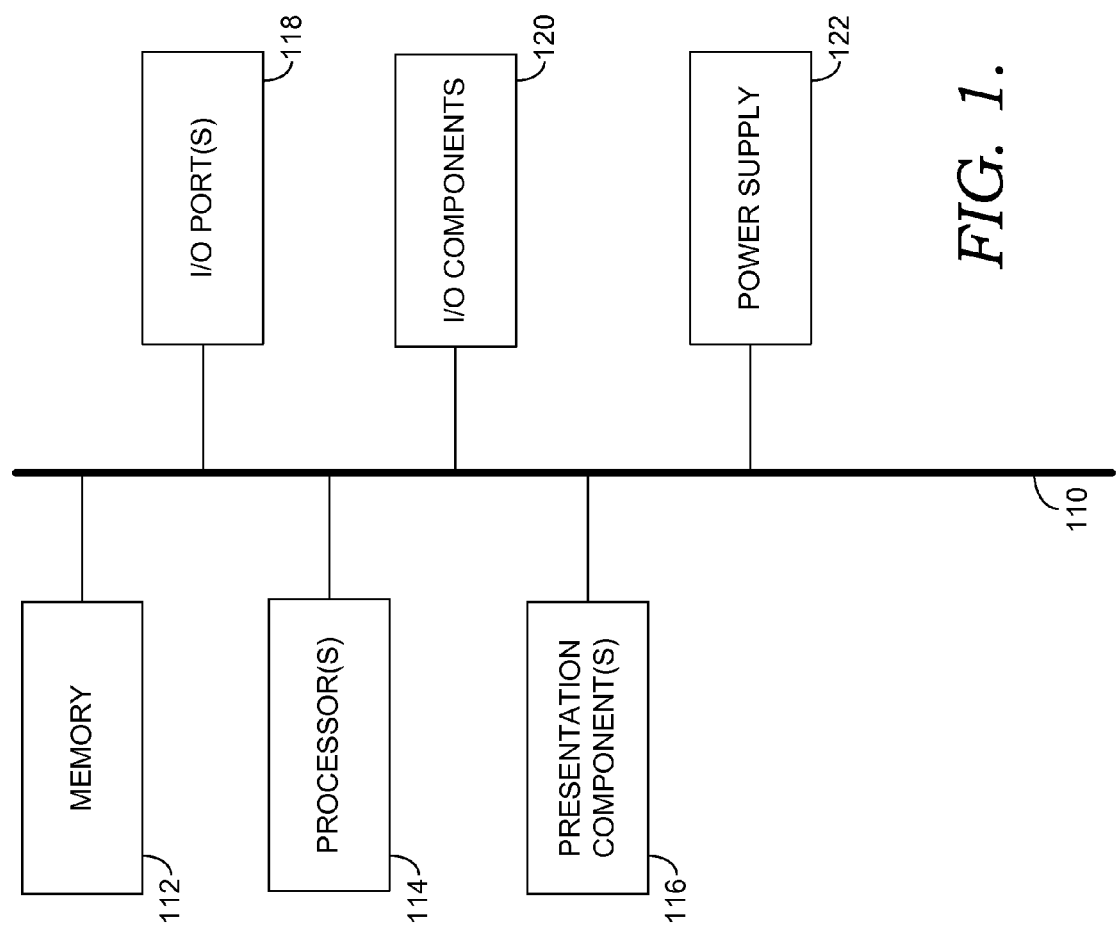
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Also, it shall be noted that the disclosure of this patent document contains material that is subject to copyright protection, such as the phrase "Hybrid Cloud Coordinator." The copyright owner has no objection to the facsimile reproduction by anyone of the patent document or the patent disclosure, as it appears in the Patent and Trademark Office patent files or records, but otherwise reserves all copyright rights whatsoever. The following notice shall apply to portions of this document: Copyright 2011.

Generally, embodiments of the present invention provide technology that carries out provisioning and managing services across multiple cloud-computing networks, both private and public. For instance, this technology may function to target various available cloud-computing networks based on user-submitted terms that specify a goal state (e.g., high security, high performance, low cost, high redundancy, or robust backup). As will be described more fully below, a coordination engine, or "Hybrid Cloud Coordinator," may be employed for optimizing selection of the public cloud-computing network ("public cloud") with respect to the user-initiated terms while, concurrently, conducting load-balancing and data-management tasks upon account information placed on the selected public cloud.

As used herein, the phrase "coordination engine" is not meant to be limited to any particular piece of software residing at any single location, but generally refers to an intelligent software component capable of managing and balancing the use of both cloud offerings (public and private) in a seamless way. The coordination engine may be offered as a stand-alone service from an independent entity. Or, the coordination engine may be offered as part of a solution from a cloud-service provider. In an exemplary embodiment, the coordination engine performs at least the three complimentary functions: (a) provision accounts across clouds, (b) tracking the results/history of provisioning for future analysis and optimization, and (c) managing decisions based on the terms provided by a client in light of properties abstracted from the clouds.

By way of example, an organization may be running its own private cloud-computing network ("private cloud") while, at the same time, relying on outside cloud services (e.g., public clouds or other private clouds). In this example, the coordination engine would be effective to distribute, optimize, homogenize, and load-balance usage across the multiple clouds. That is, the coordination engine may act as an intermediary that translates and manages the flow of data between the private cloud and the public cloud(s).

Typically, when operating as an intermediary, the coordination engine operates in a manner that is transparent to the administrators of the private cloud. Alternatively, when operating as a resource for selecting a service, the coordination engine makes visible a comparison of those services offered by various providers. As such, once an administrator selects service(s) with the coordination engine upfront, the coordination engine is capable of automatically using the selections to distribute, alter, and retrieve data without the administrator's oversight on which private cloud should be targeted. Accordingly, requests to use resources on the private cloud(s) may be provided in an abstract manner—absent the specificity of a certain external storage location. Thus, the coordination engine assists in leveraging the capabilities of the public cloud(s) whenever it suits the goals of the client, without disturbing the client's normal operations.

By way of example, the coordination engine may be configured by an administrator to provision services containing sensitive information on the client's private cloud while storing the less sensitive ones on a third-party public cloud. Thus, the coordination engine can interpret the sensitivity of data earmarked for storage and send the data to the appropriate location based on the sensitivity transparent to the client. In this way, the coordination engine offers access to services across various public and private clouds that have differing characteristics (e.g., resilient to attack and expensive vs. stable and inexpensive) and can intelligently target and distribute workload to appropriate cloud(s) based on those characteristics.

Accordingly, in one aspect, embodiments of the present invention relate to one or more computer-readable media that has computer-executable instructions embodied thereon that, when executed, perform a method for assigning workload to one or more candidate computer networks based on criteria provided from a client. Initially, the method involves receiving a request for computing resources from the client and receiving the criteria associated with the request. Typically, the criteria specify client-preferred properties of the candidate computer network(s). A coordination engine is employed to perform an analysis of the criteria with respect to metrics. In an exemplary embodiment, the processes of analyzing include carrying out the following steps: accessing the metrics at a metrics database, where the metrics are mined from the candidate computer network(s); and comparing the criteria against the metrics, respectively. Based on the comparison, in part, at least one computer network of the candidate computer network(s) is targeted. Generally, the targeted computer network exhibits metrics that satisfy the criteria. At some later time, an interaction is initiated with the targeted computer network.

In another aspect, embodiments of the present invention relate to a computerized method for distributing workload to one or more public computing networks external to a private enterprise network. The method includes the steps of receiving a request issued from a user of the private enterprise network to update account information hosted on the public computing network(s) and identifying a target network from the public computing network(s) that is responsible for hosting the account information. In instances, one or more commands may be extracted from the request. By way of example, the command(s) represent, in part, instructions for implementing the update. The commands may be translated into a format consistent with a rules language observed by the target network when interacting with an external source. Further, the translated commands may be distributed to computing resources, associated with the target network, that are designated to implement the update to the account information.

In yet another aspect, embodiments of the present invention relate to a computer system for performing a method that monitors properties of one or more public clouds and selects an appropriate public cloud for hosting account information based on those properties. Generally, the computer system includes a processing unit coupled to a computer storage medium, where the computer storage medium stores a plurality of computer software components executable by the processing unit. Initially, the computer software components include a rules data store, a metrics data store, agent(s), a coordination engine, and a feedback mechanism. The rules data store is designed to persist terms provided by an administrator associated with a private cloud. As described more fully below, the terms expose criteria that the administrator deems valuable for an external cloud-computing network to embody (e.g., cost, security, persistence of data, and the like). The metrics data store operates to accept and maintain the properties that describe qualities of the public clouds designated as candidates for hosting the account information. These clouds may be automatically designated by the coordination engine or manually selected by the administrator.

The agent(s) are programmed to dynamically collect the properties by crawling the candidate public cloud(s) and to report the collected properties to the metrics data store. One example of the agent includes a pricing agent that is programmed to retrieve expected fees for usage from the candidate public cloud(s). The coordination engine is configured, in embodiments, to decide which of the candidate public cloud(s) to select as a target cloud for hosting the account information. In one instance, the process of deciding includes a variety of steps that include, but are not limited to, the following: accessing the rules data store to examine the terms; accessing the metrics data store to examine the properties; selecting the target cloud as a function of an analysis of the properties in light of the terms; and sending a request to the target cloud to allocate computing resources for hosting at least a portion of the account information. The feedback mechanism is tasked with evaluating the decision of the coordination engine to access whether the target cloud—during operation of running a user's applications or storing a user's data—satisfies the terms incident to being selected.

General aspects of cloud-computing networks will now be described in the following several paragraphs. Typically, as used herein, the phrase "private cloud" is meant to generally represent a private cloud-computing network operated by the administrator, while the phrase "target cloud" represents at least one public cloud-computing network operated by a cloud-service provider. Typically, a cloud-computing network acts to store data or run service applications in a distributed manner. For instance, the cloud-computing network may include nodes (e.g., computing devices, processing units, or blades in a server rack) that are allocated to run one or more portions of a user's service applications. When more than one separate service applications are being supported by the nodes, the nodes may be partitioned into virtual machines that concurrently run the separate service applications, respectively, in individualized computing environments that support the resources and/or operating system specific to each service application.

Further, each service application may be divided into functional portions such that each functional portion is able to run on a separate virtual machine. Generally, "roles" provide a template description of the functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings, which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of components for carrying out functions thereof.

In embodiments, a service model is employed to determine which attributes, or a set of attributes, are to be conveyed from the instances of the roles of the service application. As utilized herein, the phrase "service model" is not meant to be limiting and generally refers to any communication that includes information pertaining to establishing and managing instances of a service application within a data center. Generally, the service model is an interface blueprint that provides instructions for managing component programs of the service application. The service model acts to guide a fabric controller in coordinating activities between the deployed component programs upon deployment to distributed locations throughout the distributed operating environment. In one instance, the service model includes a description of which roles of the service application are to be established, or how the instances of each of the roles are to be installed and activated within the data center. That is, the service model serves as an articulation of which roles should be running for the service application and conditions for where instances of the roles should be installed through a cloud-computing network.

Although various differing types of cloud configurations have been described, it should be understood and appreciated by those of ordinary skill in the art that other suitable structures of cloud-computing networks may be used, and that embodiments of the present invention are not limited to those distributed service applications across virtual machines described herein. Having briefly described an overview of embodiments of the present invention, an exemplary operating environment suitable for implementing embodiments of the present invention is described below.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

System for Implementation

Technology introduced by embodiments of the present invention for provisioning and managing services (e.g., applications and data) across multiple clouds, both private and public. This technology will also help determine the optimal targeting of the various available clouds based on criteria (e.g., configuration policies and a goal state) supplied by a client, such as security, performance, cost, redundancy, and backup. An exemplary system for implementing this technology will now be discussed with reference to FIG. 2. Generally, this technology employs a coordination engine 230 to interface between the client 205, a private cloud 210 and one or more public clouds 250. In one instance, interfacing involves abstracting information (e.g., metrics) that describe services offered across multiple clouds, where some clouds may be configured with redundancies (providing enhanced resilience and stability), while other clouds are less expensive (offering fewer features). Once the information is abstracted and analyzed, the coordination may publish the information to the client 205 in order to make a decision on which clouds to target. Or, the coordination may compare desirable features input by the client 205 against the abstracted information to automatically target best-fit cloud(s).

In another instance, interfacing involves intelligently distributing workload (e.g., based on the abstracted information) to the targeted cloud(s) without the need for the client 205 to manually convert data to be readable by the targeted cloud(s). That is, the coordination engine 230 facilitates simplistic interaction with the services at the targeted cloud (s). By way of example, this interaction is carried out by the coordination engine 230 translating the communications from the client 205 or private cloud 210 to the respective languages employed by the targeted cloud(s).

Figure 2:
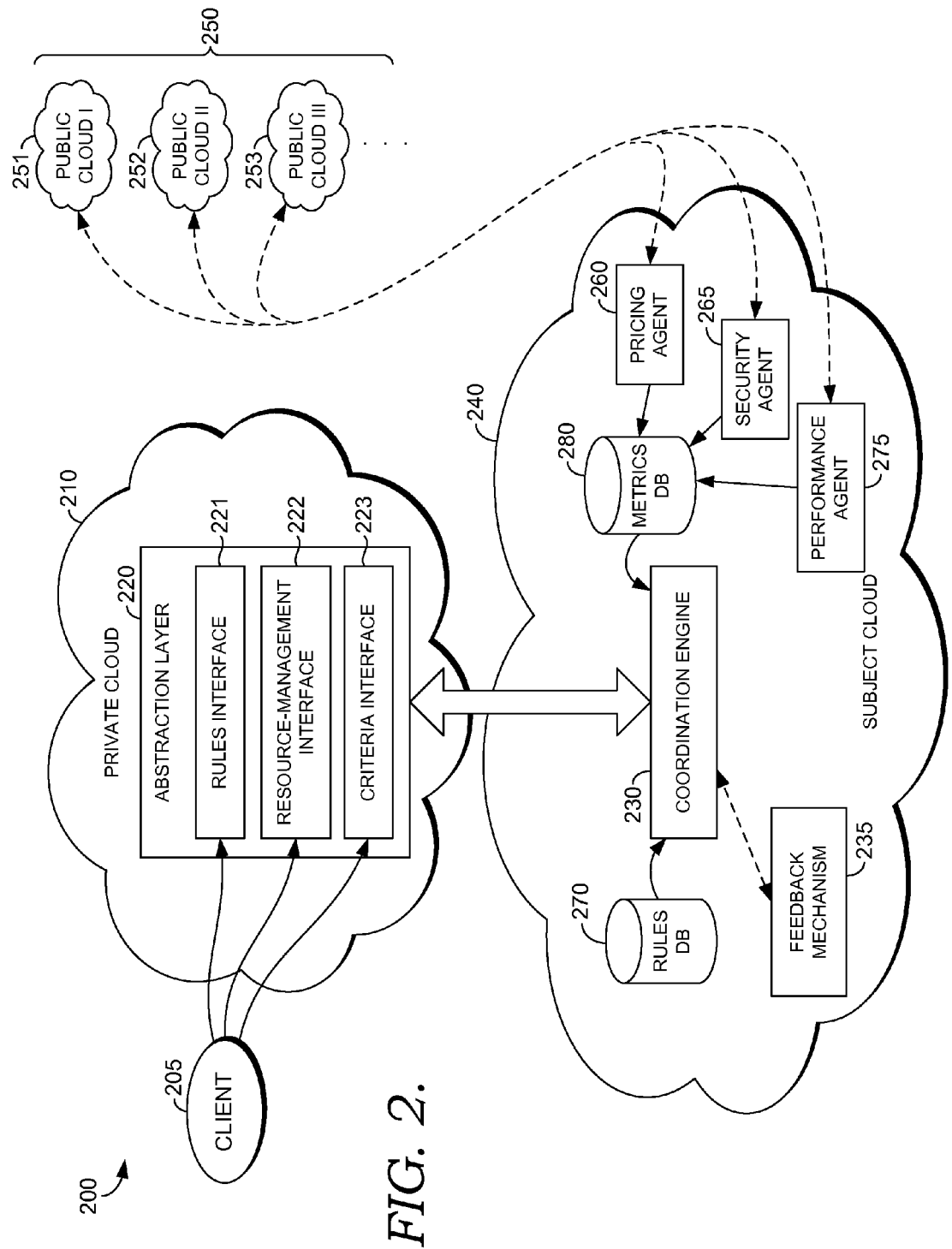
FIG. 2 is a block diagram illustrating a distributed computing environment, suitable for use in implementing embodiments of the present invention, that is configured to select a public cloud and to manage communications with the selected public cloud.

Turning now to FIG. 2, a block diagram is illustrated showing a distributed computing environment 200, suitable for use in implementing embodiments of the present invention. The distributed computing environment 200 includes the client 205 associated with the private cloud 210, an abstraction layer 220 within the private cloud 210, the coordination engine 230 for interfacing between various components, a feedback mechanism 235, a subject cloud 240 for hosting various components, a group of public clouds 250, a pricing agent 260, a security agent 265, a rules database (DB) 270, a performance agent 275, and a metrics DB 280. It will be understood and appreciated by those of ordinary skill in the art that the clouds 210, 240, and 250 shown in FIG. 2 are merely an example of computing networks suitable for accommodating workload (e.g., data and/or service applications) and are not intended to suggest any limitation as to the scope of use or functionality of embodiments of the present invention. Neither should the clouds 210, 240, and 250 be interpreted as having any dependency or requirement related to any single resource, combination of resources (e.g., DBs 270 and 280), or set of APIs (e.g., coordination engine 230) to access the resources. Further, although the various blocks of FIG. 2 are shown with lines for the sake of clarity, in reality, delineating various components is not so clear, and metaphorically, the lines would more accurately be grey and fuzzy.

The subject cloud 240 represents any cloud-computing network (e.g., an extension of the private cloud 210 or one of the public clouds 250 being considered for targeting) and may include various resources that are communicatively coupled to the coordination engine 230. Some of the resources involve the feedback mechanism 235, the pricing agent 260, the security agent 265, and the performance agent 275, which represent software components, programs, or apps that are interconnected via the subject cloud 240. The subject cloud 240 hosts these resources on tangible computing elements, such as nodes or virtual machines within the nodes. Accordingly, the resources may be distributably placed across various physical computing elements, as opposed to being individual self-contained items. In addition, the subject cloud 240 facilitates communication over channels connecting the resources to services (e.g., abstract layer 220) on other cloud-computing networks, such as the private cloud 210 and the public clouds 250. By way of example, the communication channels may include, without limitation, one or more local area networks (LANs) and/or wide area networks (WANs). Such networking environments are commonplace in offices, enterprise-wide computer networks, intranets, and the Internet. Accordingly, the network is not further described herein.

An exemplary configuration of the DBs 270 and 280 will now be discussed. Initially, the DBs 270 and 280 represent data stores residing internal to or external of the subject cloud 240, and are programmed to host differing types of data. For example, the rules DB 270 may be programmed to persist terms provided by an administrator (e.g., client 205) associated with the private cloud 210, where the "terms" represent criteria the administrator deems valuable for an external cloud-computing network to embody. Thus, in operation, the terms help the administrator identify features of one or more of the public clouds 250 that would best support the application or data to be hosted. Further, the terms help the coordination engine 230, upon accessing the rules DB 270, to select the most appropriate cloud(s), public and/or private, to designate as the targeted clouds for receiving workload. In another embodiment, the metrics DB 280 is programmed to accept and maintain the properties (e.g., abstracted information) that describe qualities of the public clouds 250 designated as candidates for hosting the account information.

The DBs 270 and 280 are generally configured to store information associated with an analysis procedure for comparing cloud-abstracted metrics against client-supplied criteria, as discussed below with reference to FIG. 5. In various embodiments, such information may include, without limitation, terms, criteria, abstracted information, metrics, and other properties of the clouds 210, 240, and 250. In addition, the DBs 270 and 280 may be configured to be searchable for suitable access of stored information. For instance, the rules DB 270 may be searchable for terms, criteria, and other information shown in FIG. 4, while the metrics DB 280 may be searchable for metrics, properties of clouds, and other information shown in FIG. 3. It will be understood and appreciated by those of ordinary skill in the art that the information stored in the DBs 270 and 280 may be configurable and may include any information relevant to the functionality carried out by the coordination engine 230. The content and volume of such information are not intended to limit the scope of embodiments of the present invention in any way. Further, though illustrated as single, independent components, the DBs 270 and 280 may, in fact, be a plurality of data stores, for instance, a database cluster, portions of which may reside on the subject cloud 240, other clouds 210 and 250, another external computing device (not shown), and/or any combination thereof.

An exemplary set of information stored on the metrics DB 280 will now be discussed with reference to FIG. 3. Generally, FIG. 3 shows an exemplary schematic diagram of a manifest 300 that lists properties abstracted from public and/or private clouds, in accordance with an embodiment of the present invention. These properties may be stored as entries within the manifest 300 of the metrics DB 280. As illustrated, the first entry within the manifest 300 describes a storage-type resource in a cloud-computing network operated by a service (e.g., Amazon) that is directed toward storing data. The availability score (99.9%) for this storage service represents one metric used by the coordination engine 230 of FIG. 2 to make decisions in light of the terms in the rules DB 270. In one instance, the availability score represents the percentage of time that the storage service is expected to be available without disconnection or falling offline. The performance score (123.456) is employed for selecting an appropriate service when computing capacity (e.g., GB/s or CPU) is specified as a desirable criteria. The pricing scheme ($0.02 per GB) is generally the rate charged by the storage service for allocating computing capacity to maintain the client's data remotely.

Further, the second entry within the manifest describes a hosting-type resource in a cloud-computing network operated by a service (e.g., Windows Azure) that is directed to hosting an application. Typically, the application is distributed across virtual machines running on nodes within the hosting service. In comparison with the storage service, the hosting service is evaluated to have a higher availability score, which corresponds to greater accessibility by the client. Also, the hosting service of the second entry has a higher performance score than the storage service, which corresponds to faster processing. Last, the pricing scheme ($0.15 per hour) of the hosting service is formatted differently than the scheme of the storage service. The metrics DB 280 is configured to convert the distinct pricing schemes to a normalized scheme in order to allow for comparison between the storage service and the hosting service.

It should be appreciated that other properties of cloud services may be abstracted and stored within the manifest 300. For instance, characteristics of the virtual machines used by the hosting service, which are typically based upon the applications and operating-system properties, may be described within the manifest in order to ensure the hosting service will properly accommodate functionality of the client's application. The criteria provided from the admin. is used to select clouds by comparing the criteria against the entries.

Turning now to FIG. 4, an exemplary schematic diagram of a manifest 400 that lists terms or criteria submitted by an administrator for guiding selection of public and/or private cloud(s) is shown, in accordance with an embodiment of the present invention. Typically, the manifest 400 is maintained by the rules DB 270 of FIG. 2. As illustrated, the manifest 400 includes two entries: a first entry that describes criteria related to data storage; and a second entry that describes criteria related to hosting an application on a remote virtual machine. In particular, the client has specified a first criteria of significance within the first entry, which governs selection of a storage service according to a price (e.g., price <=$0.10 per GB), while the client has specified a second criteria of significance within the second entry, which governs selection of a virtual machine for hosting an application according to lack of downtime (e.g., availability >99.99%). Thus, the client is enabled to select varying criteria of importance with respect to different types of resources available at the public clouds 250.

In operation, for example, the coordination engine 230 may perform an analysis of the criteria in manifest 400 of FIG. 4 with respect to metrics in manifest 300 of FIG. 3. As a result of the analysis, the coordination engine may select an appropriate cloud to target for usage when the use of off-site resources is invoked. As illustrated, when additional external storage for private-cloud data is sought by the coordination engine, the client has specified that the pricing criteria shall be below a threshold of $0.10 per GB. The metrics indicate that the Amazon cloud-computing network charges a higher rate of $0.20 per GB and, accordingly, would not be considered as a candidate for supporting data storage. However, when additional external processing capacity for virtual machines is sought by the coordination engine, the client has specified that the availability criteria shall be greater than 99.99%. The metrics indicate that the Windows Azure cloud-computing network offers 99.999% availability and, accordingly, would likely be considered as a candidate for hosting an application.

Although various different configurations of manifests, and the type of entries therein, have been described, it should be understood and appreciated that other types of suitable formats for maintaining a mapping between cloud identities and their respective metrics and criteria may be used, and that embodiments of the present invention are not limited to the exemplary design of the manifests 300 and 400 described herein. For instance, the metrics and criteria may be stored in a common index within a single data store.

In embodiments, a rules language is employed by the coordination engine 230 that defines how the coordination engine will weigh the criteria that match the metrics, where the processing of weighing (e.g., attaching varying importance to individual criteria) governs the decision of which public cloud (e.g., cloud I 251, cloud II 252, and/or cloud III 253) to target for provisioning resources for the private cloud 210 of FIG. 2. In one instance, the rules language may also assist in defining the rules used by the coordination engine when performing the analysis of the criteria in light of the metrics. For example, the rules may govern how which criteria are absolute (must be met by a cloud's metrics to consider it a candidate for hosting) and which criteria are optional (desirable attribute for a cloud but not preclusive from consideration).

In some instances, the rules are automatically set by the coordination engine 230. For example, the coordination engine 230 may establish rules that remove from consideration any clouds that are located in a country presently afflicted with political conflict. These automatically set rules are typically overarching in nature and override rules input by the client or other users. By way of example, if a client's application is written to act in a networking environment and the client manually sets rules that emphasize a high level of security (e.g., enforcing restricted access) while coordination engine 230 automatically sets rules that allow for monitoring the status of the client's application by a third party to ensure compliance with cloud protocol, the conflict is resolved in favor of the coordination engine's rules.

In other instances, the rules may be manually set by the client. For example, the client may establish rules that identify one metric as absolute, while other specified metrics are optional. In one example, if the client represents a financial institution, the absolute rule that enhanced security of sensitive account information may be manually set, thereby dictating that the account information is viewable only by customers that are authorized and verified to access the account information. In another example, if the client represents an equipment manufacturer, the absolute rules may establish that reliability of access to data may be manually set, thereby dictating that the data be consistently and readily available to various users at various times. Thus, the rules allow the client to weight and/or rank criteria into a hierarchy (e.g., emphasis on security or reliability), while also allowing the client to designate rules as absolute or simply optional. Consequently, the rules, once set, govern how data and/or an application is to be managed in light of the criteria.

Although various different configurations of rules and the manner of their influence on criteria have been described, it should be understood and appreciated that other types of suitable user- or system-prescribed schemes for assigning importance to criteria may be used, and that embodiments of the present invention are not limited to the exemplary rules for ranking, weighting, setting as absolute, and setting as optional. For instance, one set of rules may be attached to a client's application, which affect criteria for selecting virtual machines, while another set of rules may be attached to a client's data, which affect criteria selecting storage locations within clouds.

Returning the FIG. 2, the abstraction layer 220 (e.g., software development kit) residing on the private cloud 210 will now be discussed. As illustrated, the abstraction layer 220 includes various interfaces that are generally provided to serve as an intermediary through which the client 205 may interact with the coordination engine 230 residing on the subject cloud 240, which may or may not be associated with the private cloud 210. These various interfaces include, but are not limited to, the following: a rules interface 221, a resource-management interface 222, and a criteria interface 223.

In one instance, the rules interface 221 and the criteria interface 223 allow customers to programmatically define rules and criteria, respectively, for the coordination engine 230 to observe when selecting candidate clouds that, in turn, results in provisioning resources on the selected clouds that match the terms dictated/desirable by the client 205. The operation of the interfaces 221 and 223 will be discussed more fully below with reference to the method for facilitating selection of a cloud depicted in FIG. 5. In another instance, the resource-management interface 222 operates as a mechanism to allow the client 205 to transparently interact with a target cloud, selected from the public clouds 250, without performing detailed conversions of commands or learning protocols of external data centers. Accordingly, the resource-management interface 222 within the abstraction layer 220 acts as a library of protocols employed by the public clouds 250 and, in addition, acts as a translator that uses the library to automatically convert the client's commands to an appropriate language and format. Thus, the resource-management interface 222 is able to accept abstract instructions, such as increase/decrease external file storage capacity, without any particular knowledge of the actual cloud implementation.

As briefly mentioned above, the agents 260, 265, and 275 are tasked with periodically contributing information that is fed into the metrics DB 280 in order to update the metrics (e.g., entries of manifest 300 of FIG. 3) that are accessible to the coordination engine 230. In one instance, the metrics are extracted from the public clouds 251-253 individually. In another instance, metrics may be mined from other sources, such as the subject cloud 240, the private cloud 210, and the like in order to consider these other sources as candidates for hosting the client's data and/or application(s). The precise sources that are crawled by the agents 260, 265, and 275 may be manually determined by the client 205 or automatically established by the system. In one embodiment of automatically establishing sources to be crawled, a database schema may be generated to drive the location and identity of the information being collected from the sources.

Generally, the agents are assigned separate roles that include mutually exclusive information to collect and submit to the metrics DB 280. For instance, the pricing agent 260 may be assigned the role of dynamically collecting pricing information from the different sources. In a particular example, the pricing agent 260 may be pointed toward various online locations (e.g., URL addresses) and may be programmatically configured to retrieve the pricing information from clouds arrived upon by navigating to the online locations. As illustrated, the pricing agent 260 is pointed to three online locations that correspond with the public cloud I 251, the public cloud II 252, and the public cloud III 253, respectively. The pricing agent 260 may be instantiated with parameters that govern how to interface with the public clouds 251-253. Further, the pricing agent 260 may be instantiated with parameters that govern when to contact the public clouds 251-253. For instance, pricing agent 260 may be programmed to collect specific information from the public clouds 251-253, designated as the candidate clouds, at a predefined interval. In embodiments, the coordination engine 230 is responsible for instantiating and managing the parameters of the pricing agent 260, while the client 205 is often enabled to alter configuration settings of the pricing agent 260, in order to conform with one or more rules within the rules DB 270, for example.

Once collected, the pricing information collected by the pricing agent 260 is reported back to the metrics DB 280. This pricing information is used to update the records of the metrics DB 280 in order to provide the coordination engine 230 up-to-date data to be considered when making a decision. Out-of-date pricing information may be dumped from the metrics DB 280 upon being replaced by the up-to-date data. Further, the metrics DB 280 may be configured to categorize and filter the pricing information for easier use by the coordination engine 230.

Although the pricing agent 260, which is programmed to retrieve pricing information (e.g., expected fees for usage) from the public clouds 251-253, has been described in detail, embodiments of the present invention contemplate a variety of other agents that interact with the public clouds 250 (e.g., talk directly or via an API) and collect a variety of other information that may be deemed useful for evaluating a cloud. Similar to the pricing agent 260, these other agents may be programmed to dynamically collect information (e.g., properties, attributes, characteristics, and the like) from the public clouds 251-253 by crawling the public clouds 251-253 and reporting the collected information to the metrics DB 280. In one instance, the agents may include a security agent 265 that is programmed to measure a level of security imposed by the public clouds 251-253, respectively, and/or a performance agent 275 that is programmed to measure a level of availability support by the public clouds 251-253, respectively.

Although various specific rates of collection of data (e.g., 10 scans per minute) have been delineated for the agents 260, 265, and 275, it should be appreciated and understood that embodiments of the present invention consider any type of temporal basis for collecting the information from the clouds crawled by the agents 260, 265, and 275. For instance, certain interactions of the client 205 with the abstraction layer 220 may provoke the coordination engine 230 to ask the agents 260, 265, and 275 to update the metrics DB 280.

Further, although depicted on the subject cloud 240, which is the same cloud that hosts the coordination engine 230, the agents 260, 265, and 275 may be located on any private or public cloud. For instance, if the agents 260, 265, and 275 begin consuming too many resources, they may be moved to one or more of the public clouds 250.

The feedback mechanism 235 is generally configured to evaluate the decisions of the coordination engine 230 in order to access whether the target cloud satisfies the criteria specified by the client 205 incident to being selected for use. In embodiments, the evaluation performed by the feedback mechanism 235 includes various steps, such as the following: reviewing past decisions of the coordination engine 230; self-evaluating the impact of those decisions in order to improve performance; and applying an outcome of the self-evaluation to the rules DB 270. Accordingly, the feedback mechanism 235 automatically establishes or modifies rules in order to filter spurious criteria from those criteria that are as reliable as expected. Thus, the feedback mechanism 235 can adapt the rules to reweight criteria and to disregard some information drawn from the public clouds 251-253 as being persistently inaccurate in order to actually achieve the desired results.

The Coordination Engine

The coordination engine 230 generally represents an intelligent software component capable of managing and balancing the use of both cloud offerings (public and private) in a seamless way. In embodiments, the coordination engine 230 may be offered as part of the private-cloud solution (installed as a feature within an appliance at the private cloud 210) or, as illustrated in FIG. 2, located remotely from the client 205 within a subject cloud 240. Further, the coordination engine 230 may be divided or reproduced onto two or more data centers. In operation, the coordination engine 230 seamlessly performs two complimentary functions: making decisions based on the rules provided by the client 205 in light of the metrics; and provisioning accounts across the clouds 210, 240, and/or 250 while keeping track of the results/history for future analysis and optimization (e.g., utilizing the feedback mechanism 235).

With regard to the first function above, the coordination engine 230 may be designed to decide which of the public clouds 250 are considered as candidate clouds and to select as a target cloud for hosting the client's account information one or more of the candidate clouds. In embodiments, the process of deciding which of the public clouds 250 are to be considered as candidate clouds includes accessing the rules DB 270 to examine the criteria in light of the rules and accessing the metrics DB 280 to examine the metrics (e.g., properties individual to the public clouds 250). Typically, examining includes accessing the DBs 270 and 280, which have information organized according to a database schema to promote expedient discovery thereof, and retrieving the appropriate information from the DBs 270 and 280. In embodiments, the process of selecting the target cloud from the public clouds 250 involves selecting the target cloud as a function of a comparison between the retrieved information against the criteria weighted/modified via the rules, where the targeted cloud exhibits metrics that substantially satisfy the criteria. Upon selecting the target cloud, the coordination engine 230 may be further configured for sending a request to the target cloud to initiate interaction with the targeted cloud and to allocate computing resources for hosting at least a portion of the client's account.

With regard to the second function above, the coordination engine 230 is capable of managing the client's activities on the targeted cloud(s). In one instance, this manner of managing the client's activities allows the client 205 to provide commands within requests, which are composed of abstract information that generally describe the intended interactions of the private cloud 210 with a cloud-based platform (e.g., clouds 240 and 250). These requests may be issued and carried out without the client 205 tracking and/or analyzing low-level details of the day-to-day operations of the system. Thus, the coordination engine 230 relieves the client 205 from understanding an implementation of each API that monitors the ongoing transactions between the private cloud 210, via the resource management interface 222, and the cloud-computing platform. In other words, the client 205 does not have to have upfront knowledge of where new data should be addressed and where the old data is stored. Instead, the client 205 is merely responsible for generating noncloud-specific requests to use resources, where the requests include commands that are formed in an abstract way. In embodiments, the coordination engine 230 also assists the client 205 in leveraging the power of the public clouds 250 whenever it suits its goals without disturbing the normal operations of the private cloud 210.

Beyond invoking processes that allow for the client 205 to provide commands in an abstract format, the coordination engine 230 optionally makes intelligent decisions in the background that apply the commands when making determinations affecting the client's account. These intelligent decisions are generally rules-based and may be configurable based on manual and/or automatic modifications to the rules. For example, the rules may dictate that the coordination engine 230 iteratively uses the different metrics when dynamically addressing an incoming client request to determine which of the public clouds 250 best fulfills the request.

One exemplary use of the coordination engine 230 will now be discussed. Assuming the client 205 is a company that is in the business of selling backup solutions and assuming the company's usage of storage can be high and unpredictable, the company would likely benefit from leveraging the elasticity of a public cloud. Initially, this company would setup the coordination engine 230 at an application local to the private cloud 210. Or, the company may acquire the services of another cloud that is hosting coordination engine 230.

Once access to the coordination engine 230 is acquired, the company may configure the coordination engine 230 by setting rules and criteria via the rules interface 221 and the criteria interface 223, respectively, of the abstraction layer 220. When setting the criteria, the company may primarily opt for a lowest price. The coordination engine 230 would understand the current prices for the public clouds 250 that are designated as candidate clouds (e.g., clouds the company identified that they would be willing to use). Further, the company may submit the operation expenses (i.e., maintenance costs) for running the private cloud 210 in order to have it considered as one of the candidate clouds.

At some later time, the company may issue a request for a certain amount of GB of storage for newly generated data. The coordination engine 230, at the time of issuance of the request, will attempt to find the least expensive candidate cloud. Once the least expensive candidate cloud is discovered, it is designated as the target cloud and provisioned to serve the company's data-storage requirements as conveyed within the request. Further, in embodiments, the coordination engine may return a token representing a storage account placed on the target cloud. The company may use the token to call the storage account, via the abstraction layer 220, when issuing read/write commands to affect data within the storage account. The coordination engine uses the token to identify the target cloud and to translate the read/write commands to native commands of the target cloud. Accordingly, the company's responsibilities to identify the target cloud within the request and to translate the commands embedded within the request are assumed by the coordination engine 230.

This distributed computing environment 200 is but one example of a suitable environment that may be implemented to carry out aspects of the present invention, and is not intended to suggest any limitation as to the scope of use or functionality of the invention. Neither should the illustrated exemplary system architecture of the distributed computing system 200 be interpreted as having any dependency or requirement relating to any one or combination of the components 220, 230, 235, 260, 265, 270, 275, and 280 as illustrated. In some embodiments, one or more of the components 220, 230, 235, 260, 265, 270, 275, and 280 may be implemented as stand-alone devices. In other embodiments, one or more of the components 220, 230, 235, 260, 265, 270, 275, and 280 may be integrated directly into one or more of the clouds 210, 240, or 250. It will be understood by those of ordinary skill in the art that the components 220, 230, 235, 260, 265, 270, 275, and 280 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one private cloud is shown, many more may be communicatively coupled to the coordination engine(s) 230).

Method for Facilitating Selection of a Cloud

Figure 5:
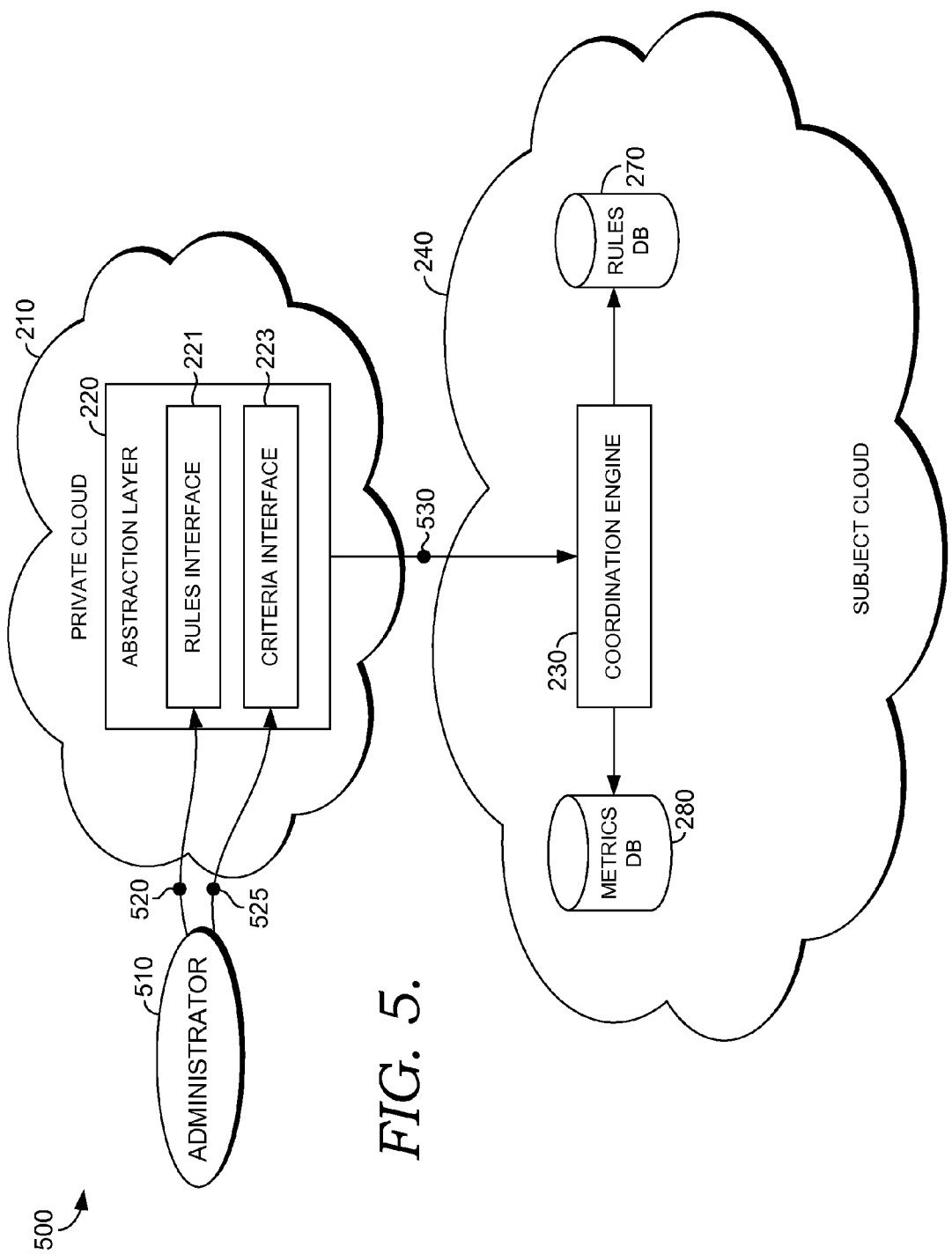
FIG. 5 is a block diagram illustrating a distributed computing environment being employed to facilitate selection of the public and/or private cloud(s), in accordance with an embodiment of the present invention.
Figure 7:
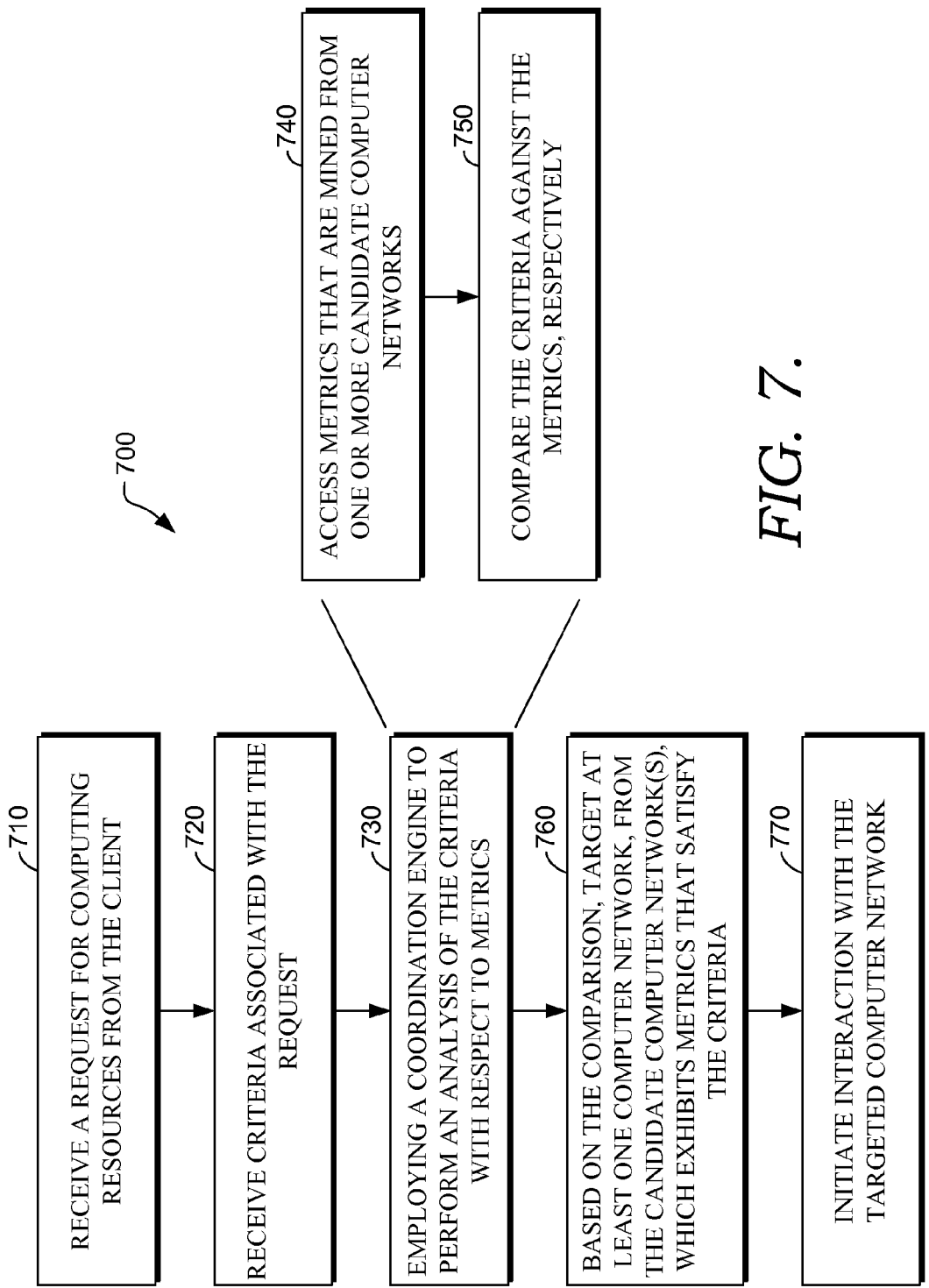
FIG. 7 is a flow diagram showing an overall method for assigning workload to one or more candidate computer networks based on criteria provided from a client, in accordance with an embodiment of the present invention.

Turning now to FIG. 5, a block diagram illustrating a distributed computing environment 500 being employed to facilitate selection of the public and/or private cloud(s) is shown, in accordance with an embodiment of the present invention. As illustrated, the computing environment 500 includes aspects of the computing environment 200 of FIG. 2, where like reference numerals represent substantially similar components. Further, the computing environment 500 will be discussed in the context of the flow diagram of FIG. 7, wherein the flow diagram shows an overall method 700 for assigning workload to one or more candidate computer networks based on criteria provided from the administrator 510 in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described.

Initially, the administrator 510 (employee of the client's IT department) may notice that the private cloud 210 of the enterprise generates a significant increase in use of an application, thus, creating a demand for hosting services that supply virtual machines. The administrator 510 may issue a request 530 for resources via the abstraction layer 220 to the coordination engine 230, as indicated at block 710. In one instance, the request 530 may be for 100 terabytes of computing resources for a six-month project.

As indicated at block 720, the administrator 510 may further provide rules 520 and criteria 525 within the request via the rules interface 221 and the criteria interface 223, respectively. In one instance of providing the criteria 525, the administrator 510 may access an interaction application that cooperates with the abstraction layer 220 that renders a GUI in which the administrator may submit the request for the computing capacity with accompanying criteria 525. Typically, the criteria 525 specify client-preferred properties of an optimal public cloud. By way of example, the accompanying criteria 525 may indicate that low pricing is most critical, while other criteria 525 such as high-security and high-performance requirements are desirable yet optional.

Upon communicating the request 530 to the coordination engine 230, the coordination engine 230 may perform an analysis of the criteria 525 with respect to metrics in the metrics DB 280, as indicated at block 730. In an exemplary embodiment, the process of analyzing includes carrying out the following steps: accessing the metrics at the metrics DB 280 (see block 740), and comparing the criteria 525 against the metrics (see block 750). In embodiments the coordination engine 230 may consider the metrics by applying the rules 520 from the rules DB 270 to the criteria metrics 525. Based on the comparison, in part, at least one public cloud of the candidate clouds is targeted, as indicated at block 760. Generally, the targeted computer network exhibits metrics that satisfy the criteria 525.

At some later time, as indicated at block 770 an interaction is initiated with the targeted computer network. This interaction may provision an account on the target cloud that satisfies the request. Upon provisioning the account, the coordination engine 230 may return a URL, API, and/or token with credentials to the administrator 510 that allows for reading and writing (i.e., authentication access) to the account on the target cloud without the administrator 510 creating a language conversion mechanism to interface with the account. As such, the coordination engine 230 does not necessarily indicate the identity of the target cloud to the administrator 510. In operation, the token represents a list of IP or MAC addresses of those virtual machines within the target cloud allocated to the private cloud 210, as well as the credentials needed to access the virtual machines. Using the token, the administrator is enabled to remotely log into the allocated virtual machines and continue setting them up by enabling instances of roles and/or installing additional resources. Further, when the administrator 510 no longer has use for the virtual machines allocated on the target cloud, the token can be used to request a cancellation of service and stop accruing charges on them.

It is evident from the variety in exemplary criteria 525 discussed above that no particular cloud configuration would be ideal for each administrator 510 in every aspect. Nor will one cloud configuration exhibit the features that each administrator 510 requests, where different cloud configurations excel in different areas. Thus, the coordination engine 230 is typically programmed to track many public-cloud parameters for making optimal decisions on which cloud's resources to use. The following are cases of example optimizations.

The coordination engine 230 may optimize for an edge scenario. Assume that service providers operate a set of candidate clouds X, Y, and Z. If the service provider associated with candidate cloud X is determined to be best in class when it comes to edge caching and content delivery, then the request from the administrator 510 would be routed to the candidate cloud X rather than the candidate clouds Y or Z. As used herein, the phase "edge caching" refers to maintaining content within proximity of a main group of users (e.g., customers in Japan want copies of media close by Tokyo, as opposed to Los Angeles, so that is can be played faster).

The coordination engine 230 may optimize for a pricing scenario. Assume the service provider of candidate cloud X charges $1/GB while service providers associated with candidate clouds Y and Z charge $0.50/GB with the same reliability. Under the pricing scenario, the coordination engine 230 may route requests for storage to candidate clouds Y or Z instead of candidate cloud X. Meanwhile, the pricing agent 260 of FIG. 2 may operate as an automated service to keep the coordination engine 230 up-to-date regarding the various pricing schemes of the candidate clouds X, Y, and Z.

Further, the pricing scenario may program behavior into the rules 520 such that portions of the private cloud 210 may be unused when it is more cost-efficient to use the candidate clouds Y and Z (e.g., public clouds 250 of FIG. 2). Thus, public cloud(s) may be leveraged to allocate space on the private cloud 210 in order to react to a sudden increase in sensitive information that is designated to be stored internally. In this way, the private cloud 210 is considered to be a candidate by the coordination engine 230 just as much as any other cloud being monitored.

The coordination engine 230 may optimize for a back up scenario. Assume administrator 510 indicates within the rules 520 that the organization places a premium on reliably backing up important data. Further, the rules 520 specify that the data is to be stored redundantly on two or more of the candidate clouds X, Y, and Z to provide maximum assurance against data loss. In this back up scenario, the decision of the coordination engine 230 may be optimized for redundancy on a plurality of clouds.

The coordination engine 230 may optimize for a reliability scenario. In the reliability scenario, the coordination engine 230 may track the reliability history of the various choices it made, such as picking candidate cloud X over candidate cloud Y. The coordination engine 230 may then analyze reliability history to detect any changes in metrics extracted from the candidate clouds X and Y, such as performance, reliability, and the like. Using the analysis, the coordination engine 230 may adjust its future decisions to better optimize reliability based on the actual reliability and performance of the candidate clouds X and Y when handling the administrator's data.

The coordination engine 230 may optimize for a reseller scenario. In the case where the administrator 510 is guided by a business model where a company's sales come, in part, from hosting outside customers on the private cloud 210 in combination with other public clouds. Generally, a third-party customer of the company is not concerned with the details of where his/her data is hosted as long as the criteria 525 is fulfilled to a certain level of security and reliability. So, in the reseller scenario, the company may employ the coordination engine 230 to act as a broker and piggyback off other public clouds while pricing competition and monitoring volume to generate significant revenue. Typically a company of this kind would license this coordination engine 230 software to help run its business.

Method for Facilitating Interaction Between Clouds

Figure 6:
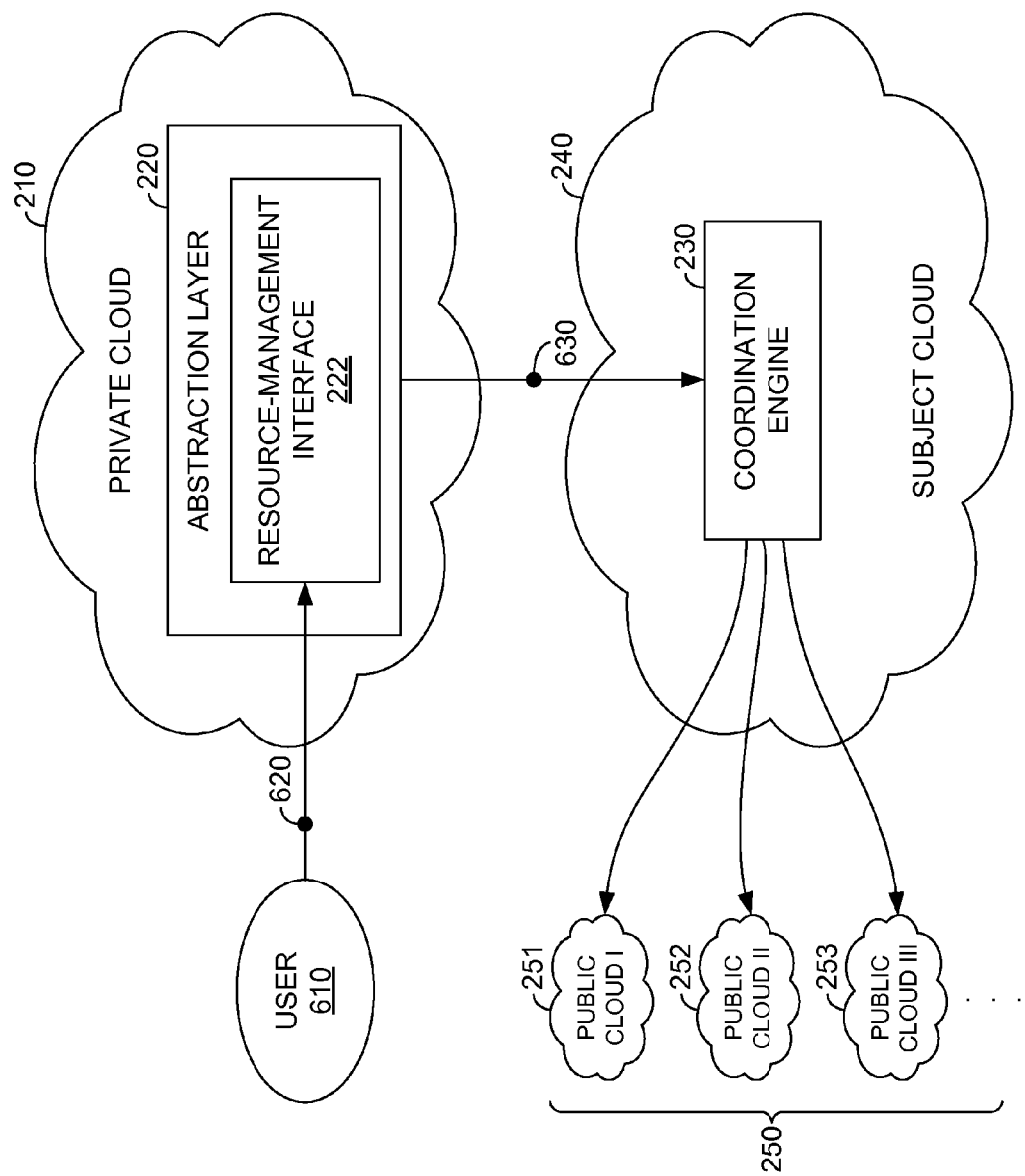
FIG. 6 is a block diagram illustrating a distributed computing environment being employed to facilitate interaction between the public and/or private cloud(s), in accordance with an embodiment of the present invention.

Referring to FIG. 6, a block diagram is shown that illustrates a distributed computing environment 600 being employed to facilitate interaction between the public and/or private cloud(s), in accordance with an embodiment of the present invention. As illustrated, the computing environment 600 includes aspects of the computing environment 200 of the FIG. 2, where like reference numerals represent substantially similar components. Further, the computing environment 600 will be discussed in the context of the flow diagram of FIG. 8, wherein the flow diagram shows an overall method 800 for distributing workload to one or more public computing networks external to a private enterprise network, in accordance with an embodiment of the present invention.

Initially, the method 800 includes the steps of receiving a request 620 issued from a user 610 of the private enterprise network, or private cloud 210, to update account information hosted on the public computing network(s) (see block 810) and identifying a target network from the public computing network(s) 250 that is responsible for hosting the account information (see block 820). In instances, as indicated at block 830, one or more commands may be extracted from the request 620. By way of example, the command(s) represent, in part, instructions for implementing the update. As indicated at block 840, the commands may be translated into a format consistent with a rules language observed by the target network when interacting with an external source. Further, the translated commands 630 may be distributed to computing resources, associated with the target network, that are designated to implement the update to the account information, as indicated at block 850.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated by and is within the scope of the claims.

What is claimed is:

1. One or more computer memory devices having computer-executable instructions embodied thereon that, when executed, perform a method for assigning workload to candidate computer networks based on criteria provided from a client, the method comprising:
   receiving, a request for computing resources from the client, the request is received via an abstraction layer that comprises one or more interfaces that serve as an intermediary for the client to interact with a coordination engine;
   receiving at the coordination engine the criteria associated with the request, wherein the criteria specify client-preferred properties for candidate computer networks;
   employing the coordination engine to perform an analysis of the criteria with respect to metrics of abstracted properties corresponding to a plurality of candidate computer networks, wherein the coordination engine employs a rules language for defining and evaluating criteria with respect to the metrics, wherein the rules languages supports client-defined weighting, ranking, absolute and optional designations for the criteria; the coordination engine dynamically updates target computer networks with candidate computer networks based on performing the analysis, wherein performing the analysis of the criteria comprises:
   (a) accessing the metrics at a metrics database, wherein the metrics are mined from the plurality of candidate computer networks, the metrics of abstracted properties are identified using agents associated with the coordination engine, the agents dynamically collect the metrics of the plurality of computer networks; and
   (b) comparing the criteria of client-preferred properties against the metrics of abstracted properties of the plurality of candidate computer networks, comparing is based at least in part on a manifest comprising metrics of abstracted properties for the plurality of candidate computer networks;
   based on the comparison targeting at least one computer network, from the plurality of candidate computer networks, which exhibits metrics that satisfy the criteria and designations; and
   initiating interaction with the at least one targeted computer network.

2. The computer memory devices of claim 1, wherein the request comprises instructions to run an application on virtual machines available at the plurality of candidate computer networks, and wherein the application is associated with the client's account.

3. The computer memory devices of claim 1, wherein the request comprises instructions to maintain data on a storage location available at the plurality of candidate computer networks, and wherein the data is associated with the client's account.

4. The computer memory devices of claim 1, wherein the criteria define particular attributes of the plurality of candidate computer networks that pertain to at least one of security, availability, cost, scalability, or geo-redundancy.

5. The computer memory devices of claim 1, further comprising:
   accessing updated metrics at the metrics database, the updated metrics are identified using agents of the coordination engine that dynamically collect information from the one or more computer network to update the metrics;

comparing the criteria of client-preferred properties against the updated metrics of the plurality of candidate computer networks; and based on the comparison, dynamically updating the at least one targeted network with at least one second targeted network, from the plurality of candidate computer networks, which exhibits updated metrics that satisfy the criteria.

6. The computer memory devices of claim 1, wherein the plurality of candidate computer networks comprise a private enterprise network and at least one public cloud-computing network, and wherein the method further comprises employing the coordination engine to manage usage of the client's account across the private enterprise network and the at least one targeted computer network.

7. The computer memory devices of claim 6, wherein the employing the coordination engine to manage usage of the client's account across the private enterprise network and the at least one targeted computer network comprises overseeing an application running on virtual machines provisioned on the at least one targeted network.

8. The computer memory devices of claim 6, wherein the employing the coordination engine to manage usage of the client's account across the private enterprise network and the at least one targeted computer network comprises tracking data maintained at a storage location provisioned on the at least one targeted network.

9. The computer memory devices of claim 6, wherein the method further comprises employing the coordination engine to provision the computer resources on the at least one targeted computer network in order to meet the request.

10. The computer memory devices of claim 6, wherein the employing the coordination engine to manage usage of the client's account across the private enterprise network and the at least one targeted computer network comprises load-balancing usage between the at least one targeted computer network and another public cloud-computing network.

11. The computer memory devices of claim 1, wherein the process of analyzing further comprises:

accessing rules from a rules database, the rules comprising additional terms for selecting the targeted computer network; and applying the rules to affect an outcome of the comparison of the criteria against the metrics.

12. A computerized method for distributing workload to one or more public computing networks external to a private enterprise network, the method comprising:

receiving a request, issued from a user of the private enterprise network to update account information hosted on the one or more public computing networks, the request is received at a coordination engine, the coordination engine dynamically provisions target computing networks from one or more public computing networks to distribute and load balance workload of the private enterprise network on the target computing network;

identifying using the coordination engine a target computing network from the one or more public computing networks, the target computing network is responsible for hosting the account information, wherein the coordination engine employs a rules language for defining and evaluating criteria with respect to the metrics, wherein the rules languages supports client-defined weighting, ranking, absolute and optional designations for the criteria;

extracting one or more commands from the request, wherein the one or more commands represent, in part, instructions for implementing the update;

translating the one or more commands into a format consistent with a rules language observed by the target computing network when interacting with an external source, and initiating a distribution of the one or more translated commands to computing resources, associated with the target computing network, that are designated to implement the update to the account information.

13. The computerized method of claim 12, further comprising, upon establishing the account information on the target computing network, releasing to the administrator a token that exposes, among other things, at least one location of the account information within the one or more public computing networks, wherein the coordination engine utilizes the token as corresponding to the at least one location such that the one or more commands are translated for the at least one location, in particular.

14. The computerized method of claim 12, wherein dynamically provisioning the target computing network further comprises:

(a) accessing a rules data store to examine terms provided by an administrator associated with the private enterprise network, wherein the terms expose criteria the administrator deems valuable for an external cloud-computing network to embody;

(b) accessing a metrics data store to examine metrics that describe qualities of the one or more public computing networks designated as candidates for hosting the account information; and (c) selecting the target computing network as a function of an analysis of the metrics in light of the terms.

15. The computerized method of claim 12, wherein evaluating the coordination engine comprises:

reviewing past decisions of the coordination engine; and evaluating an impact of the past decisions.

16. A computer system for performing a method that monitors properties of one or more public clouds and selects an appropriate public cloud for hosting account information based on the properties, the computer system comprising a processing unit coupled to a computer memory device, the computer memory device having stored thereon a plurality of computer software components executable by the processing unit, the computer software components comprising:

a rules data store that persists terms provided by an administrator associated with a private cloud, wherein the terms expose criteria the administrator deems valuable for an external cloud-computing network to embody;

a metrics data store that accepts and maintains the properties that describe qualities of the one or more public clouds designated as candidates for hosting the account information;

one or more agents that are programmed to periodically and dynamically collect the properties by crawling the one or more public clouds and to report the collected properties to the metrics data store, wherein the one or more agents are instantiated with parameters on how to interface with the one or more public clouds; and a coordination engine utilizes one or more interfaces of an abstraction layer to operate as an intermediary between private clouds requesting computing resources from public clouds, wherein the coordination engine employs a rules language for defining and evaluating criteria with respect to the metrics, wherein the rules languages supports client-defined weighting, ranking, absolute and optional designations for the criteria.

17. The computer system of claim 16, wherein the private cloud represents a private cloud-computing network operated by the administrator, and wherein the target cloud represents at least one public cloud-computing network operated by a cloud-service provider.

18. The computer system of claim 16, wherein the software components further comprise the feedback mechanism that evaluates the decision of the coordination engine for establishing rules or modifying rules to optimize provisioning target clouds.

19. The computer system of claim 16, wherein the one or more agents comprise a pricing agent that is programmed to retrieve expected fees for usage from the one or more candidate public clouds, and wherein the one or more agents comprise a security agent that is programmed to measure a level of security imposed by the one or more candidate public clouds.

20. The computer system of claim 16, wherein the target cloud is dynamically updated with a second target cloud based on updated properties of one or more public clouds of the public clouds, the updated properties identified based on the one or more agents dynamically collecting properties of the public clouds.

* * * * *